US012657375B2

(12) United States Patent
Pesallaccia

(10) Patent No.: US 12,657,375 B2
(45) Date of Patent: Jun. 16, 2026

(54) LATERAL DATA PROPAGATION FOR FILLABLE FIELD COMPLETION OF FILLABLE FORMS

(71) Applicant: Alexandra Lozano Immigration Law, PLLC, Tukwila, WA (US)

(72) Inventor: Matias Pesallaccia, Bothel, WA (US)

(73) Assignee: Alexandra Lozano Immigration Law, PLLC, Tukwila, WA (US)

( * ) Notice: Subject to any disclaimer, the term of this patent is extended or adjusted under 35 U.S.C. 154(b) by 251 days.

(21) Appl. No.: 18/678,744

(22) Filed: May 30, 2024

(65) Prior Publication Data

US 2025/0013817 A1     Jan. 9, 2025

Related U.S. Application Data

(60) Provisional application No. 63/525,715, filed on Jul. 9, 2023.

(51) Int. Cl.
  *G06F 40/174*     (2020.01)
  *G06F 40/103*     (2020.01)
(52) U.S. Cl.
  CPC .......... *G06F 40/174* (2020.01); *G06F 40/103* (2020.01)
(58) Field of Classification Search
  None
  See application file for complete search history.

(56) References Cited

U.S. PATENT DOCUMENTS

| | | | |
|---|---|---|---|
| 8,214,362 B1* | 7/2012 | Djabarov | G06F 40/174 715/224 |
| 10,454,906 B1* | 10/2019 | Sharfman | H04L 63/0428 |
| 2005/0198563 A1* | 9/2005 | Kristjansson | G06F 40/174 715/224 |
| 2012/0063684 A1* | 3/2012 | Denoue | G06V 30/412 382/175 |
| 2014/0025443 A1* | 1/2014 | Onischuk | G07C 13/00 705/12 |
| 2015/0205777 A1* | 7/2015 | Campanelli | G06V 30/418 715/226 |
| 2015/0317295 A1* | 11/2015 | Sherry | G06F 40/117 715/226 |
| 2018/0032286 A1* | 2/2018 | Panda | G06F 3/1288 |
| 2020/0050845 A1* | 2/2020 | Foncubierta Rodriguez | G06V 30/412 |
| 2020/0380071 A1* | 12/2020 | Sundar | G06F 40/174 |

(Continued)

*Primary Examiner* — Toan H Vu
(74) *Attorney, Agent, or Firm* — Powell IP Law, PLLC

(57)     ABSTRACT

Systems and methods for efficient completion of form-fillable documents are presented. To minimize interactions with remote sources, in initializing a set of form-fillable documents, a single data access to a data source is made for field data of equivalent fillable fields in a set of form-fillable documents, of which there may be many that are equivalent (using the same base data). The accessed field data is then propagated throughout the equivalent fillable fields in the set of fillable documents. Similarly, upon the modification of the field data of a fillable field, the modified field data is then "laterally" propagated to equivalent fillable fields within the set of form-fillable documents. Still further, in saving data from the fillable fields, a single data access with the data source is made for each distinct field type among the form-fillable documents. Advantageously, consistency among equivalent fillable fields is maintained.

16 Claims, 9 Drawing Sheets

(56)  References Cited

U.S. PATENT DOCUMENTS

| 2020/0394259 A1* | 12/2020 | Onuma | ................... | G06F 17/18 |
| 2021/0133788 A1* | 5/2021 | Jacobs | ............... | G06Q 10/0637 |
| 2023/0052224 A1* | 2/2023 | Goodsitt | ............... | G06F 40/174 |

* cited by examiner

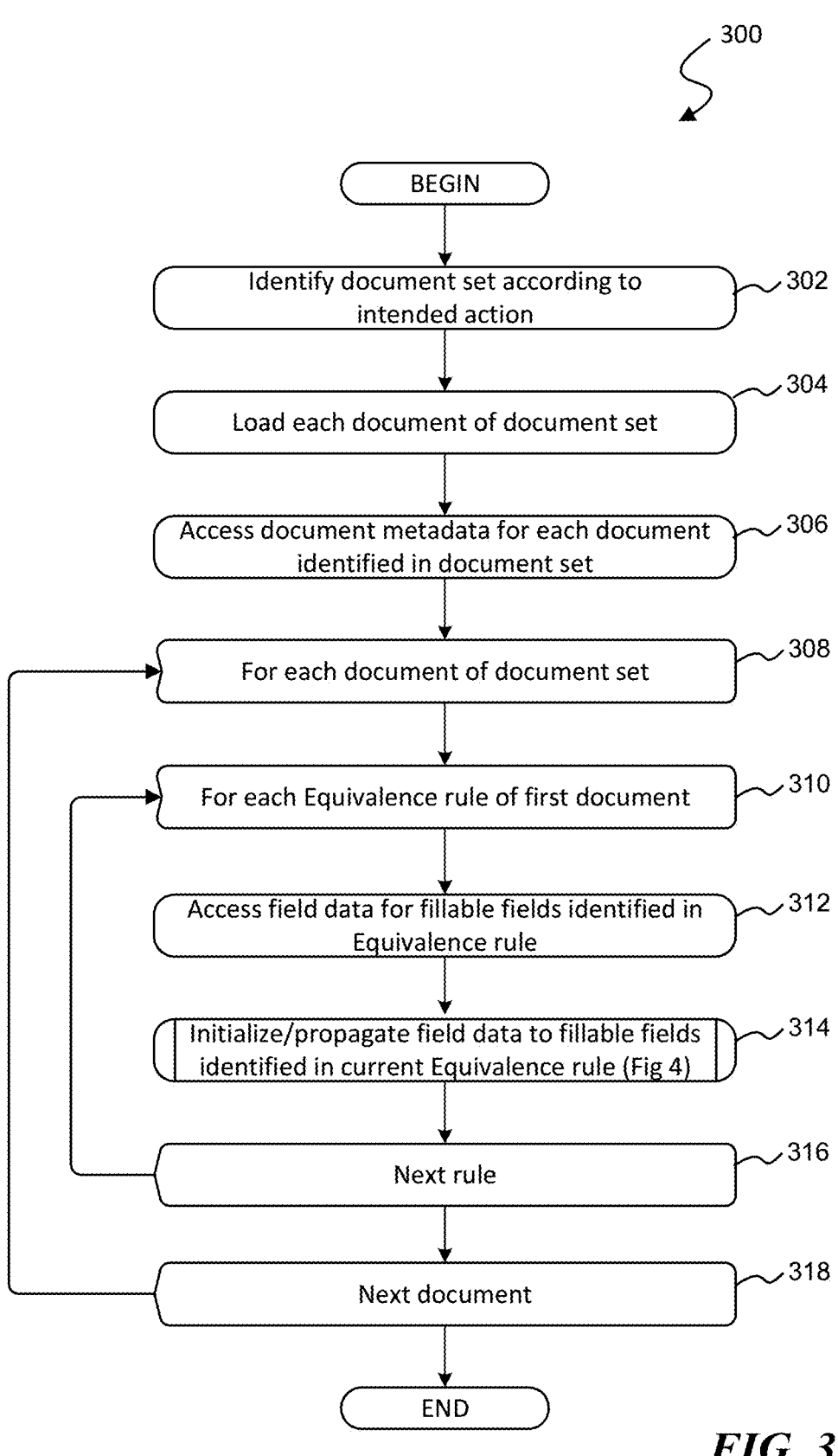

300

BEGIN

Identify document set according to intended action — 302

Load each document of document set — 304

Access document metadata for each document identified in document set — 306

For each document of document set — 308

For each Equivalence rule of first document — 310

Access field data for fillable fields identified in Equivalence rule — 312

Initialize/propagate field data to fillable fields identified in current Equivalence rule (Fig 4) — 314

Next rule — 316

Next document — 318

END

*FIG. 3*

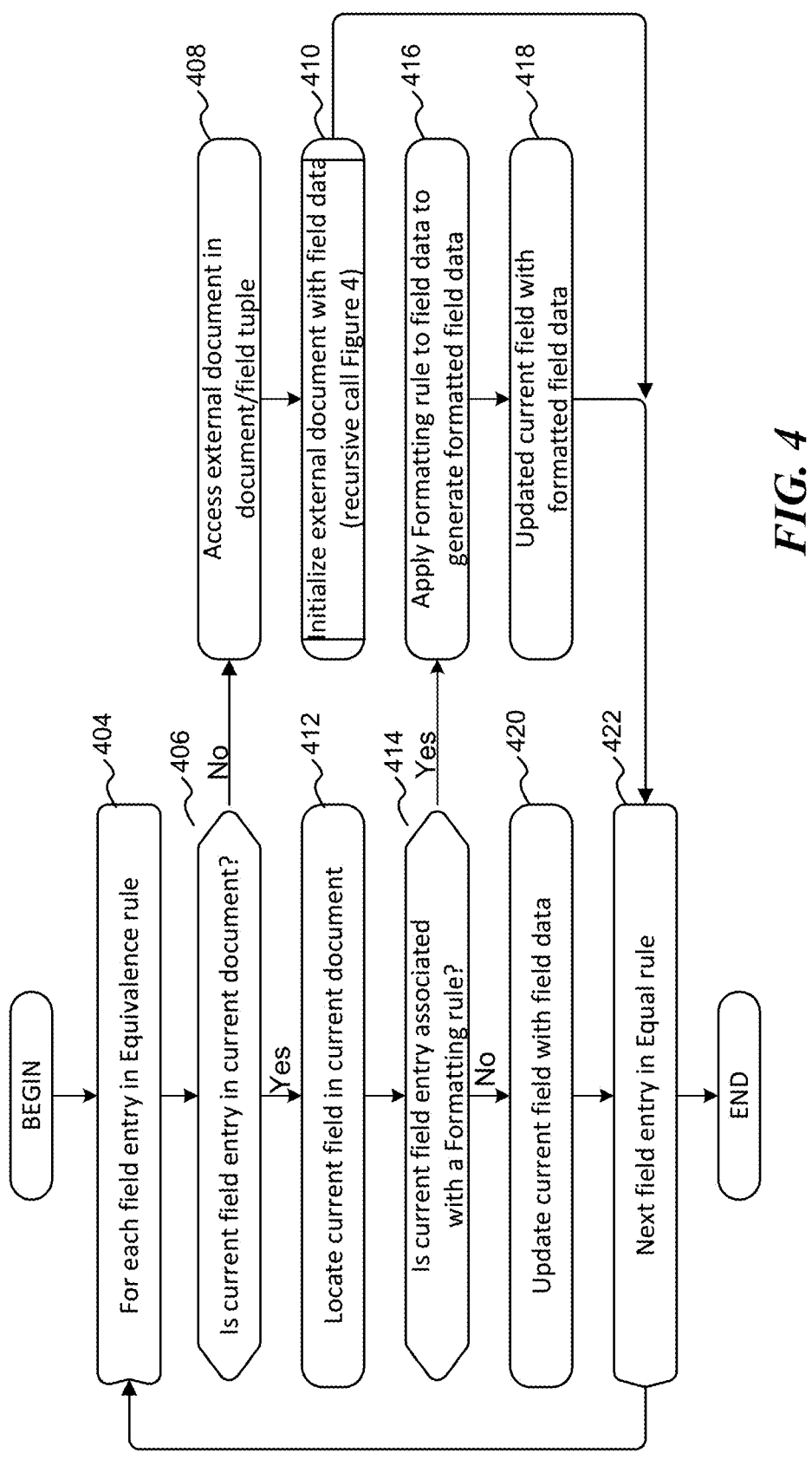

BEGIN

For each field entry in Equivalence rule — 404

Is current field entry in current document? — 406

Access external document in document/field tuple — 408

Initialize external document with field data (recursive call Figure 4) — 410

Locate current field in current document — 412

Apply Formatting rule to field data to generate formatted field data — 416

Updated current field with formatted field data — 418

Is current field entry associated with a Formatting rule? — 414

Update current field with field data — 420

Next field entry in Equal rule — 422

END

BEGIN

702 — For each document in document set

704 — Access document metadata for each document identified in document set

706 — For each Equivalence rule of current document

708 — Is local semaphore for current field data set?

710 — Access field data for first fillable field in Equivalence rule

712 — Store field data to data store

714 — Next Equivalence rule

716 — Next document

END

LATERAL DATA PROPAGATION FOR FILLABLE FIELD COMPLETION OF FILLABLE FORMS

CROSS-REFERENCE TO RELATED APPLICATIONS

This application claims priority to U.S. Provisional Patent Application No. 63/525,715, entitled "Form Completion with Validation," filed Jul. 9, 2023, the entirety of which is incorporated herein by reference.

BACKGROUND OF THE INVENTION

When interacting with a governmental agency, a person or entity must typically complete and submit a complex set of forms that involves the input of data into various fields within the forms. That governmental agency then reviews the forms for accuracy and completeness. Only when all requirements of the forms are correctly and fully completed does that agency make a determination to provide whatever service or benefit that is requested by the forms. If something is not properly (or incorrectly) completed, the forms are returned to the submitter for amendment and the process must start anew.

By way of illustration, to submit an immigration matter to the United States Custom & Immigration Service (USCIS) for an immigrant to gain lawful entry or employment, it is necessary to correctly and fully complete a specific set of forms corresponding to the desired result (e.g., entry, employment, etc.) Of course, the set of forms needed to be completed varies depending on a desired result. Sometimes, even for the same type of case/result, the number of forms needed to be completed can vary. For instance, for an immigration case (entry) that also claims a VAWA (Violence Against Women Act) consideration, the addition of the VAWA assertion will require between six to eight additional forms to be completed and submitted with other immigration forms to the USCIS for consideration.

While these forms could be completed "by hand," typically the forms are computerized, fillable forms (or fillable documents), such as documents utilizing the ubiquitous portable document format (PDF). Fillable forms, such as those used by the USCIS, have numerous fillable fields (some forms with up to 400 fillable fields), are complex and the data required in a given field is often nuanced. Indeed, an item of data, such as an applicant's name, is often required at multiple locations (i.e., fields) within a single document and/or among set of documents, but the entry format for that item of data (e.g., full name) varies among fields requesting the data, even in the same document. For example, some fillable fields corresponding to a name might require only a middle initial, while other fillable fields in the same document might require the full middle name.

Unfortunately, data entered incorrectly and/or inconsistently into fillable fields will nearly always result in a rejected submission. Thus, form completion requires attention to detail, as even minor errors and/or minor inconsistencies can have a significant impact on a submission, including a complete and permanent rejection of a submission.

Completing forms, including fillable forms, involves several challenges. Firstly, forms are quite often very extensive and complex, containing repetitions, dependencies and distinct nuances among fields. Manually undertaking this form filling process is time-consuming and increases the likelihood of human error, including as inconsistencies, typographical errors, and/or incomplete information.

In addition to the complexity of fillable documents and/or forms, due to the requirements of an organization, e.g., USCIS, that publishes fillable forms, these forms are periodically updated. Indeed, many (if not most) government agencies periodically update their fillable forms. In systems that map data between a data store to specific fillable fields in a fillable form or document, form updates result in significant work to remap data to the fillable fields in a newly released form. Correspondingly, these updates often add to the overall complexity and time investment necessary to complete a set of fillable forms, and again increase the potential for mistakes during the update process.

While there are some products that carry out automated form fill-in on fillable forms, these rely upon an extensive mapping from a data source (e.g., a database or datafile, a customer relations management (CRM system) and the like) to the fields of a fillable document. Moreover and importantly, they provide automated form fill-in only when the link between the form fill-in product and the data source is available/active. Further, these products fail to address consistency and nuanced issues among fields, adapt to specialized formatting rules for a given field, and fail to provide form validation or quality assurance of the completed forms.

BRIEF DESCRIPTION OF THE FIGURES

The foregoing aspects and many of the attendant advantages of the disclosed subject matter will become more readily appreciated as they are better understood by reference to the following description when taken in conjunction with the following drawings, wherein:

FIG. 3 is a flow diagram illustrating an exemplary routine or process for initializing one or more fillable documents in accordance with aspects of disclosed subject matter;

FIG. 4 is a flow diagram illustrating an exemplary routine useful for propagating initialization data among equivalent fillable fields of one or more fillable documents, all in accordance with aspects of the disclosed subject matter;

DETAILED DESCRIPTION

Figure 1:
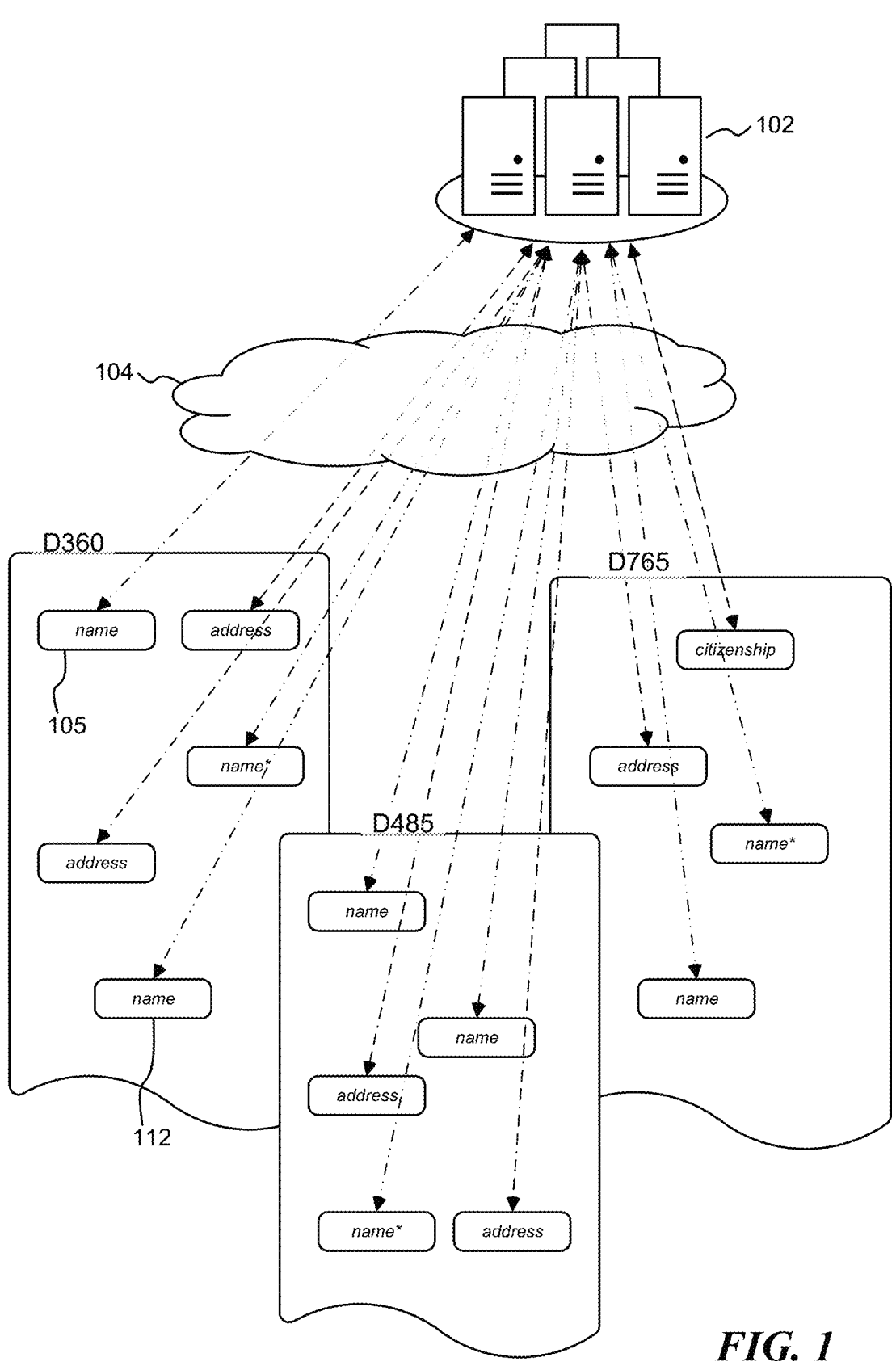
FIG. 1 is a pictorial diagram illustrating a typical access pattern for initializing fillable forms.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there are multiple instances of the term/item. For example, the term "user(s)" should be interpreted as one or more users. Further still, the term "and/or" should be construed as being a non-exclusive or (i.e., one or the other(s), or all).

The term "propagating" in the context of disseminating field data to equivalent fillable fields among one or more documents should be interpreted as copying the field data from a source fillable field and entering the field data into the equivalent field. In the case of the source fillable field, the field data may be transformed before "propagation" if there is a formatting rule applied to the source fillable field. Similarly, in the case of the equivalent fillable field, the field data may be transformed before actual entry into the equivalent fillable field if there is an applicable formatting rule to be applied to the equivalent fillable field. The term "lateral propagation" is a reference to the propagation of field data among fillable fields that are equivalents.

While much of the present discussion is made in regard to fillable forms from a government/political organization, it should be appreciated that this is for illustrative purposes and should not be construed as limiting upon the disclosed subject matter. Indeed, aspects of the disclosed subject matter may be suitably and advantageously applied to fillable forms and/or fillable documents of a variety of types, irrespective of the origin of the forms/documents. Fillable forms are ubiquitously found with respect to the practice of law, and in business administration. These and many other areas require lengthy, complex and/or multiple fillable forms to realize a desired result. Aspects of the disclosed subject matter may be advantageously applied to all of these areas and others.

In accordance with aspects of the disclosed subject matter, a computer-implemented method for conducting form fill-in is described. As part of the method, a request to carry out a first activity (and/or a desired result) is received, wherein the first activity includes the completion of one or more fillable forms (also referred to as fillable documents, or in most cases, just documents). In response to the request to carry out the first activity, a document set corresponding to the first activity is identified, where the document set identifies one or more fillable forms to be completed. Each fillable form includes at least one fillable field, though more typically, the fillable forms include a plurality of fillable fields. Additionally, each fillable form of the document set is associated with corresponding metadata. Each set of metadata includes one or more rules for use in completing the corresponding fillable form.

The method further comprises obtaining first data corresponding to a first fillable field in a first fillable form of an identified document set. Accessing a first Equivalence rule of the one or more rules from the corresponding metadata of the first fillable form. An Equivalence rule, such as the first Equivalence rule, identifies one or more fillable fields that use the same field data to complete the fillable field. For purposes of this documents, the use of the same field data indicates that the fillable fields are "equivalent." In this instance, the Equivalence rule includes the first fillable field, to be completed using the first data. An iteration is begun, for each fillable field of the first Equivalence rule, where the first data is entered into fillable field identified in the Equivalence rule. Advantageously, all fillable fields in the first fillable form that utilize the same data, in this case the first data, are automatically updated or completed. Further, through the use of Equivalence rules, these fillable fields in the first fillable form that share the first data are automatically completed or updated irrespective of whether the first data was obtained from an electronic data source or manually entered by a computer user interacting with the computer-implemented method.

According to additional aspects of the disclosed subject matter, in addition to identifying fillable fields within the first fillable form, the first Equivalence rule may also include equivalent fillable fields in other documents, possibly including the documents in the document set. In iterating through the fillable fields identified in an Equivalence rule, such as the first Equivalence rule, the first data may be propagated to the other documents in the document set. Indeed, an Equivalence rule need only identify one equivalent fillable field in an external document to complete the lateral propagation to all other equivalent fillable fields in that external document. This relies on the fact that each document has its own metadata identifying equivalent fillable fields and once one fillable field in that document is completed, lateral propagation to equivalent fillable fields in that document may, and does, take place.

Advantageously, with a single access to obtain the first data (or entry of the first data by a user), equivalent fillable fields among multiple documents of a document set are completed using exactly the same base field data, i.e., the first field data.

According to further aspects of the disclosed subject matter, as part of completing a first fillable field with the obtained first data, a determination is made as to whether the first fillable field is associated with a Formatting rule. Formatting rules for fillable fields are also stored in the metadata of a fillable form. If a formatting rule is applicable to the first fillable field, the base data (first data) for the fillable field is formatted according to the applicable Formatting rule and then formatted first data is entered into the first fillable field.

According to alternative aspects of the disclosed subject matter, and after initial startup propagation of data through the fillable field of the fillable forms in the document set, changes made by a person to field data in a second fillable field in a second fillable form of the document set is propagated through equivalent fillable fields (i.e., those fillable fields of the fillable forms of the documents in the document set that share the same base data. Propagation to the equivalent fillable fields among the documents in the document set is carried out in a similar manner as the initial propagation of those same fields. More particularly, second data of the second fillable field is captured, and a second Equivalence rule for the second fillable field is identified. Thereafter, and for each identified fillable field in the second Equivalence rule, the second data is propagated among the equivalent fillable fields among the documents of the document set.

To better illustrate aspects of the disclosed subject matter, including the propagation of field data to equivalent fillable fields, we turn to the figures.

FIG. 1 is a pictorial diagram illustrating a typical access pattern used when initializing fillable forms. As shown in FIG. 1, each fillable document, such as fillable document D360 includes several fillable fields, some of which are "equivalent" fields, i.e., they contain the same or "equivalent" base data as one or more other fillable fields. For instance, fillable document D360 includes fillable fields 105 and 112 which are equivalent fillable fields, i.e., they utilize the same base field data, in this case "name." In typical fillable form processing, a mapping exists from a data source 102 to a corresponding fillable field, such as fillable field 105, irrespective of whether or not there are equivalent fillable fields in a document. Thus, typically, the mapping of data to the various fields each field is examined for each fillable field resulting in a separate interaction between the data source 102 and a mapped fillable field. Indeed, as shown in FIG. 1, with 14 fillable fields illustrated among the three fillable documents, i.e., documents D360, D485 and D760, there are 14 distinct interactions between the data source 102 and the fillable fields. Moreover, often these interactions are made over a network, such as network 104, resulting in a larger processing cost for each interaction. Indeed, while the network is sometimes a local area network, in many instances the data source 102 may be located on a wide area network, including the Internet, incurring significant processing bandwidth and time.

Figure 2:
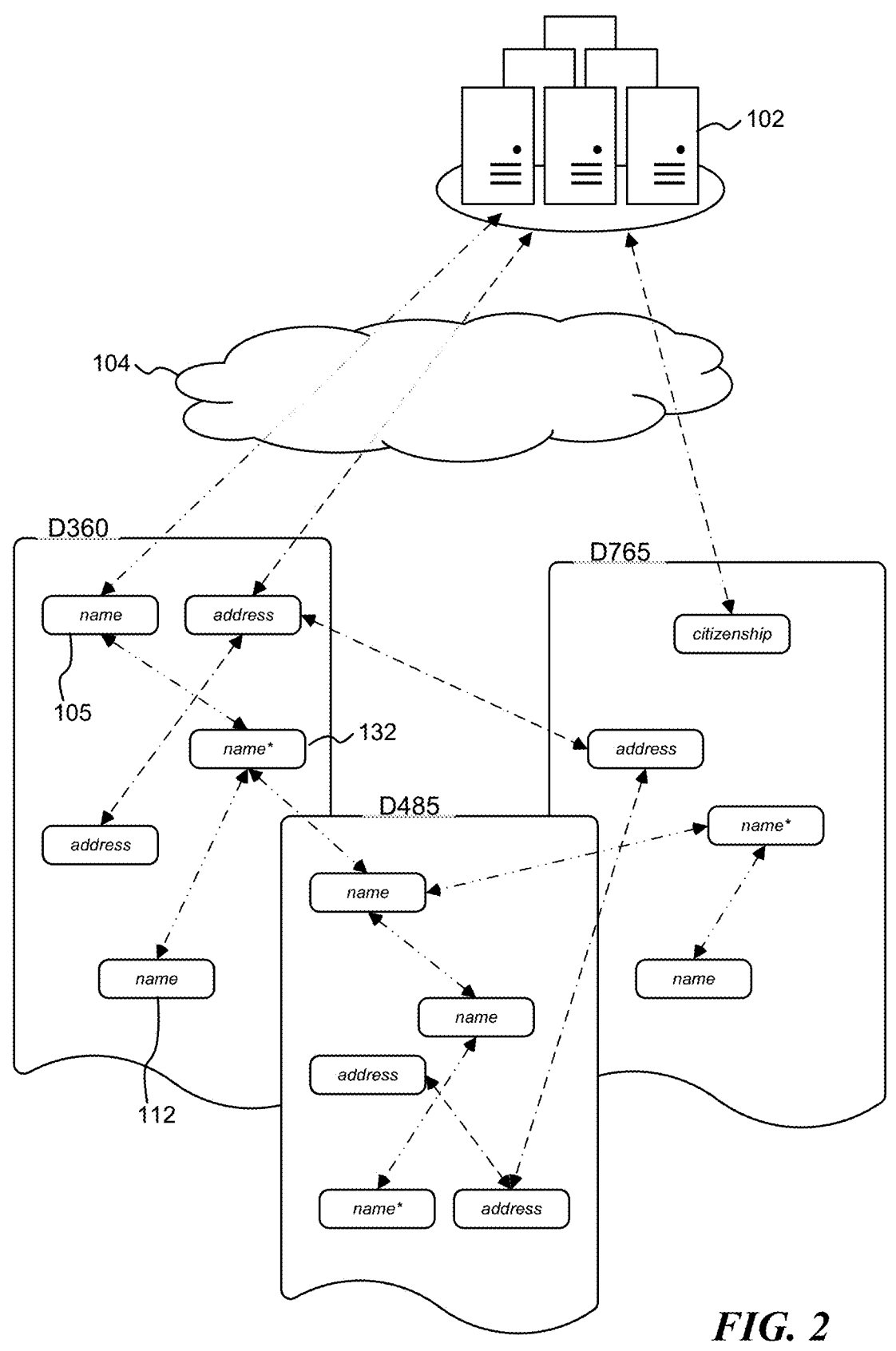
FIG. 2 is a pictorial diagram illustrating an exemplary access pattern that utilizes lateral field propagation for completing equivalent fillable fields among one or more fillable forms or documents, all in accordance with aspects of the disclosed subject matter.

In contrast to the multiple data interactions made by typical processes as illustrated in FIG. 1, FIG. 2 is a pictorial diagram illustrating an exemplary access pattern that includes lateral field data propagation for completing equivalent fillable fields among one or more fillable forms/documents, carried out in accordance with aspects of the disclosed subject matter. Indeed, implementation of various aspects of the disclosed subject matter reduces the number of interactions between a data source 102 and fillable fields within documents of a document set.

According to aspects of the disclosed subject matter, metadata for each fillable document of a document set is accessed, and the metadata of each fillable document identifies, via Equivalence rules, the fillable fields within the corresponding document that are equivalent fillable fields, i.e., that share the same/common field data. Utilizing the Equivalence rules, field data among multiple fillable fields (and with fillable fields in external documents of the document set) is retrieved once from the data source 102 and automatically propagated among the equivalent fillable fields of a fillable document. Moreover, as an Equivalence rule may identify fillable fields of external fillable documents, propagation is automatically carried out among all of the documents in the document set.

According to various embodiments of the disclosed subject matter, the metadata of a fillable form includes Equivalence rules that touch on all fillable fields within the document, whether this is only one fillable field listed/identified or a plurality. Of course, as mentioned above, an Equivalence rule needs to identify only one fillable field per external document. Indeed, by relying on the fact that Equivalence rules within that external fillable document will include information for propagating the field data among the equivalent fillable fields, linking to one fillable field of an external document is all that is needed to propagate to equivalent fillable fields in that external document.

As shown in FIG. 2, in contrast to the 14 data source/fillable field interactions that are typically made, aspects of the disclosed subject matter reduce the number of interactions from 14 to just three, one interaction for the name fillable fields, one interaction for the address fillable fields, and one interaction for the citizenship fillable field.

To more fully illustrate the process for propagating field data among duplicated fillable fields within a document, as well as to external documents in a set of documents, reference is made to FIG. 3. FIG. 3 is a computer-executable flow diagram illustrating an exemplary routine 300 for initializing the fillable fields of one or more fillable documents in accordance with aspects of disclosed subject matter. As indicated above, frequently a desired action or result may require that multiple fillable documents are completed and submitted. For instance, immigration actions and results desired from the USCIS often come as the results of submitting multiple fillable documents. Accordingly, at step 302 a document set, i.e., one or more fillable documents, is identified for a desired, intended action. For example, an immigration action to the USCIS for a non-resident desiring to enter and reside within the United States often requires at least USCIS forms D360, D485 and D760 (all fillable documents/forms) be completed and submitted for consideration.

At block 304, a first fillable document of the document set is loaded into a computer system for completion. Of course, in an alternative embodiment, each fillable document of the document set may be loaded on startup and ready for used, though loading at the time that the user switches to it, or when field data is propagated to an unloaded document, is also anticipated as part of the disclosed subject matter.

At block 306, in addition to the fillable documents of the document set, metadata for each of the fillable documents of the document set is accessed. According to aspects of the disclosed subject matter, metadata for a fillable document includes, at least, information that identifies/points to the various fillable fields of the corresponding fillable document, an indication of the type of information needed in a fillable field, and equivalent fillable fields within the document. Equivalent fields in external documents is also included; one equivalent field per external document. Other rules within the metadata may include formatting rules for specific fillable fields within the document, validation rules for ensuring completeness and consistency among the fillable fields of the fillable document (or fillable documents of the document set), and the like. A discussion of some of the rules in a fillable document's metadata is set forth in greater detail below in regard to FIG. 5.

At block 308, an iteration is begun to iterate over each fillable document identified in the document set, and particularly for initializing the fillable fields of each fillable document of the document set. The initializing is carried out according to the rules outlined in the metadata of each fillable document. As will be understood by those skilled in the art, with each iteration the currently iterated fillable document is referred to as the current document. Moreover, each fillable field of a document is listed in an Equivalence rule in the metadata. This also means that in some Equivalence rules only one fillable field is identified, the fillable field not having any other equivalent fields in the fillable document or in external documents).

At block 310 and with respect to the currently iterated fillable document, an iteration (a second iteration within the iteration among documents) of each Equivalence rule in the metadata of the currently iterated fillable document is made. This iteration ensures that all fillable fields of the currently iterated fillable document are initialized, assuming initialization data is available. As with the iteration of documents, for each iteration of Equivalence rules, the Equivalence rule of each iteration is referred to as the current Equivalence rule.

At block 312, the field data for the current Equivalence rule is accessed from a data source if available, such as data source 102. At block 314, the fillable fields identified in the current Equivalence rule are initialized with the obtained initialization field data. This initialization is described with reference to FIG. 4.

Turning to FIG. 4, this figure is a flow diagram illustrating an exemplary routine 400 useful for propagating initialization data among equivalent fillable fields of one or more fillable documents as included in an Equivalence rule, all in accordance with aspects of the disclosed subject matter. Beginning at block 404, an iteration is begun to iterate through the fillable fields identified in the current Equivalence rule (the current Equivalence currently in process per routine 300). With each iteration, the currently iterated fillable field is referred to as the current fillable field.

At block 406, a determination is made as to whether the current fillable field is a reference to a fillable field in the currently iterated fillable document (per routine 300). If the current field is not in the currently iterated fillable document, the routine 400 proceeds to block 408.

Figure 5:
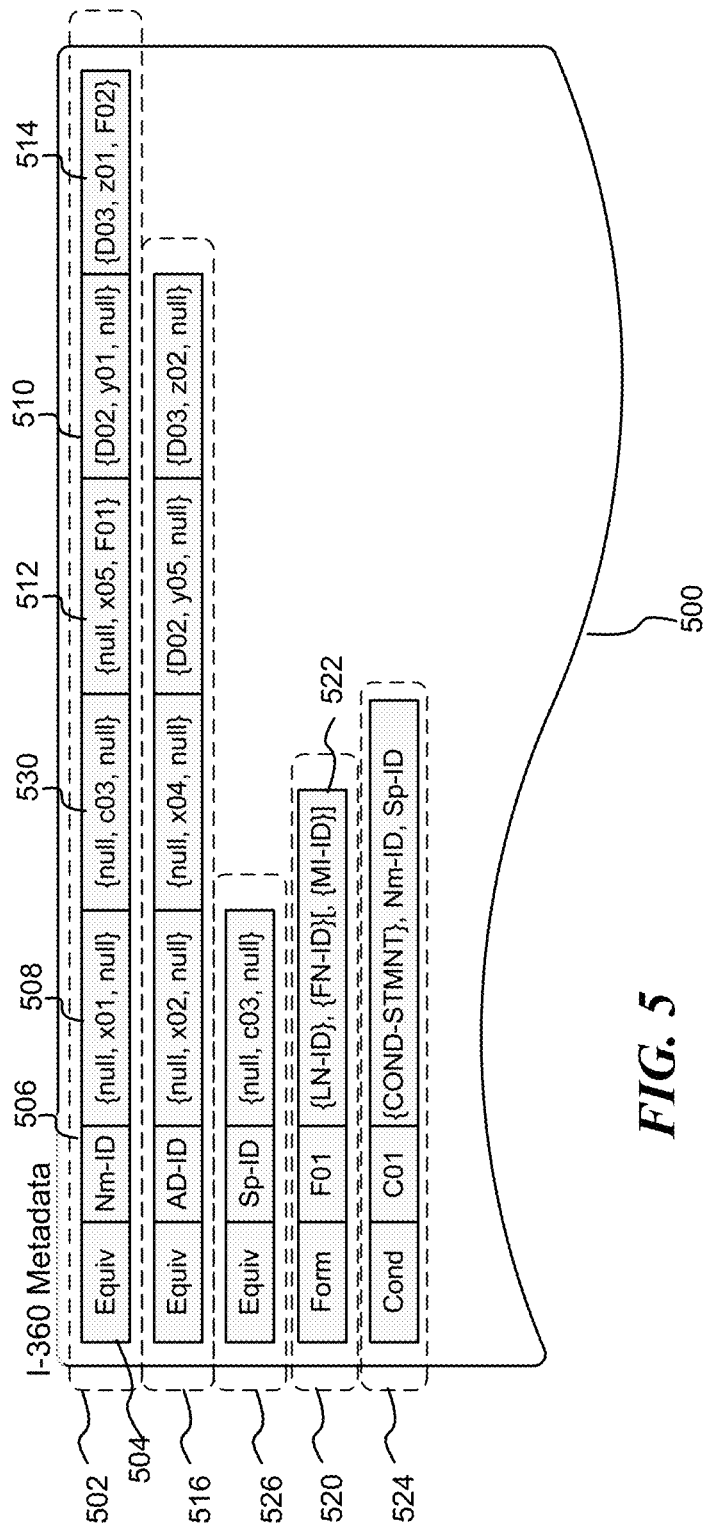
FIG. 5 is a pictorial representation of document metadata corresponding to a fillable document, the metadata comprising rules for propagating and formatting data to fillable forms of one or more fillable documents, in accordance with aspects of the disclosed subject matter.

To better understand the equivalent fillable fields identified in an Equivalence rule, reference is made to FIG. 5. FIG. 5 is a pictorial representation of document metadata corresponding to a fillable document, illustratively to the D360 document of FIG. 1. The document metadata 500 illustratively comprises rules for propagating and formatting data to fillable fields, primarily to the current fillable document, and potentially also to external fillable documents for lateral propagation purposes, all in accordance with aspects of the disclosed subject matter.

As shown, by way of illustration and not limitation, each rule (presented as a row, such as Equivalence rule 502) includes a rule identifier 504, i.e., an indicator of the type of rule. Examples include two Equivalency rules 502 and 516, and Formatting rule 520. Other rules, including additional Equivalence and Formatting rules, as well as Validation rules, may be included in document metadata. Of course, the remaining part of each rule, such as Equivalence rule 502, is based on its type. For an Equivalence rule 502, the next element of the rule is illustratively a source data identifier 506. The source data identifier, such as Nm-ID of source data identifier 506, identifies the source data in the data source 102 where the field data (if it exists) may be obtained. For illustration and not limitation, Equivalence rule 502 then contains a series of one or more triplets, where each triplet includes a document identifier (by way of illustration, a "null" for the current document as shown in triplet 508, in contrast to document identifier for an external document as shown in see triplet 510), an field identifier for specifically identifying the fillable field in the current (or external) document, and a formatting identifier corresponding to a Formatting rule (or null if no Formatting rule is to be applied.) As indicated above, Formatting rules are applied to field data in fillable fields where special formatting or presentation of the field data is required, such as shown in triplet 512 by making reference to Formatting rule 520 identified as "F01".

As suggested above, any given Equivalence rule may have links to external fillable fields in external documents, but an Equivalence rule will link to only one equivalent fillable field in any given external document. By way of illustration and with respect to Equivalence rule 502, there are two triplets 510 and 514 that reference one fillable field in each of external documents "D02" and "D03." In contrast, illustratively there are three triples referencing equivalent fillable fields in the current document (as indicated by the null in the triplets), including triplets 508 and 510.

With reference again to FIG. 4, at block 408 the external document associated with a equivalent fillable field (per the Equivalence rule) is accessed and, at block 410, the equivalent fillable field in the external document is initialized with the field data. Of course, initializing the equivalent fillable field in the external document causes the lateral propagation of the field data to other equivalent fillable fields in that external document. Further, such propagation may continue to yet other external documents.

In the present example, and as those skilled in the art will appreciate, initializing the fillable field in the external document may be accomplished through a recursive call to the current routine 400 to process the equivalent fields in the external document. Once the equivalent fillable field in the external document has been initialized, routine 400 proceeds to block 422 where the next field entry/triplet in the current Equivalence rule is selected for processing as a continuation of the iteration of Equivalence rules. Thereafter, routine 400 then returns to block 404 to continue that iteration.

Returning to decision block 406, if the current field entry in the Equivalence rule is in the current document, the routine 400 proceeds to block 412. At block 412, a determination is made as to whether the current field is associated with a formatting rule. For example and with reference to FIG. 5, triplet 512 corresponding to the "name*" fillable field 132 in FIG. 2, indicates that Formatting rule 520 is applicable to the identified fillable field. As illustratively suggested in tuple 522, this Formatting rule indicates that name data is formatted as last name, followed by first name, and optionally followed by a middle initial.

At block 416, the Formatting rule is applied to the field data to generate formatted field data. At block 418, the formatted field data is used to initialize/update the current fillable field in the current document. Thereafter, the routine proceeds to block 422. As described above, at block 422, the next entry (if any) in the Equivalence rule is selected for continued iteration.

If, at decision block 414, there is no Formatting rule associated with the current fillable field (see triplet 508), the routine proceeds to block 420. At block 420, the current fillable field is updated with the field data. Thereafter, the routine proceeds to block 422.

At block 422, if there are no additional fields/triplets to process, the iteration looping structure is terminated and routine 400 also terminates.

Returning to FIG. 3, after processing the current Equivalence rule, at block 316 a next Equivalence rule is selected and the iteration for the newly selected Equivalence rule, now the current Equivalence rule, is carried out as described above. This iteration continues until the Equivalence rules for the current document have been processed, whereupon routine 300 proceeds from block 316 to block 318.

At block 318, if there are other documents in the document set to be processed, the next document is selected, this selection becoming the current document. The routine 300 returns to block 308, and the iteration to the now-current document proceeds as described above. Alternatively, at block 318, if all the documents have been processed, the iteration terminates, as does routine 300.

With reference again to FIG. 5, as an exception to the general rule that a fillable field within a document must be included in one, and only one, Equivalence rule, there are instances in documents in which the source data of a fillable field is dependent upon the result of a condition. Due to the conditional source of field data, such conditioned fillable fields cannot always be viewed as an equivalent of others. By way of example, consider that a particular fillable field of a fillable form requires the name of a family member of an applicant. Moreover, the rules for completing that fillable field indicate that if the applicant is married, the name of the family member should be the spouse and, if there is no spouse, the applicant's oldest child.

Rather than include them in two or more separate Equivalence fields, their presence in an Equivalence rule is as a reference to a Condition rule. In reference to FIG. 5, Equivalence rule 502 includes tuple 530 that references a condition rather than a fillable field. Thus, while not shown in respect to routines 300 and 400, and 600 and 700, as an Equivalence rule (such as Equivalence rule 502) is being processed, upon encountering a reference to a Condition rule (such as Condition rule 524), the condition statement associated with the rule (shown as "COND-STMNT") is evaluated and identifies the source of the fillable field. In processing an Equivalence rule, or updating equivalent fillable fields, the source for the fillable field can be utilized in determining whether the conditioned fillable field is an equivalent of a currently processed Equivalence rule or not.

In contrast to non-conditional fillable fields (those fillable fields not associated with a condition/conditional source), the conditional fillable fields are typically identified in each Equivalence rule in which they may be associated. As illustratively shown in FIG. 5, Equivalence rules 502 and 526 include the reference ("c03") to Condition rule 524, indicating that, depending the resolution of the condition statement, the fillable field identified by "c03" may be the applicant's name or the applicant's spouse's name According to aspects of the disclosed subject matter, the condition statement associated with a Conditional rule may identify one or more other fields and include logic (Boolean and or Algebraic) to determine which source identifier is to be used with respect to a fillable field.

Advantageously, the present computer-implemented tool for completing fillable forms is operable and efficient even when no data source, such as data source 102 is available, and/or if no data in the data source is available or relevant to a current use and/or person. Moreover, even when the fillable fields are not initialized, data propagation is carried out efficiently and without resorting to/and from a data source. This means that field data does not need to flow from a modified fillable field to data source 102, and then from the data source to a equivalent fillable field. Rather, the data is propagated laterally without involving the data source. To this end, reference is made to FIG. 6.

Figure 6:
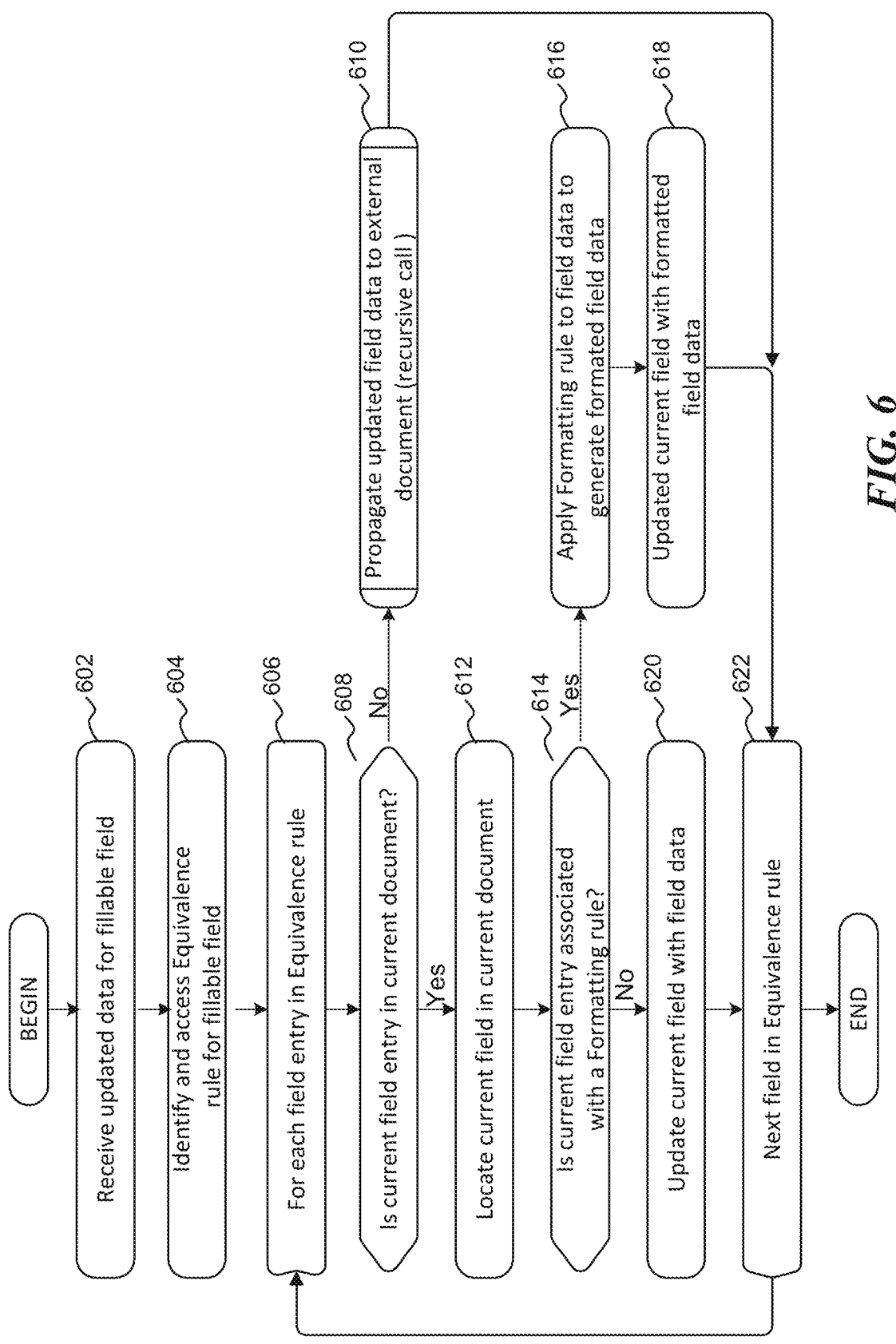
FIG. 6 is a flow diagram illustrating an exemplary computer-implemented routine or process for propagating updated field data to equivalent fillable fields of one or more fillable documents in accordance with aspects of disclosed subject matter.

FIG. 6 is a flow diagram illustrating an exemplary routine 600 for updating the field data of propagating updated field data to equivalent fillable fields of one or more fillable documents, all in accordance with aspects of disclosed subject matter. Moreover and advantageously, routine 600 enables propagation of field data among equivalent fillable fields, both within a current document and within external documents of a document set, irrespective of whether or not data a data source is currently available.

With respect to routine 600, it is assumed that a document set has been identified according to an intended action or desired result (as described above), the documents are "loaded" into a state that they can be accessed and updated, or that they can be readily loaded for access and update, that the metadata for each document is also available or can be readily made available, and that a user has made a change to the data of a fillable field.

Beginning at block 602, updated field data of an updated fillable field in the current document is received, where the updated field data is new data for the updated fillable field and for equivalent fillable fields (which are not yet updated). At block 604, an Equivalence rule corresponding to the updated fillable field is identified and accessed from the metadata of the current document.

At block 606, an iteration is begun to iterate through all the equivalent fields listed (e.g., in triplets) in the identified Equivalence rule, where each iteration processes one fillable field/triplet, referred to as the current field during its iteration/processing. With a current fillable field identified from the Equivalence rule, at decision block 608 a determination is made as to whether the current field is found within the current document (or, alternatively, in an external document for lateral propagation purposes.) If the current fillable field is not within the current document, routine 600 proceeds to block 610.

At block 610, the updated field data is propagated to the external document associated with the current field. In various embodiments, this may imply a recursive call to routine 600 to process the updated field data to the currently iterated field, as well as other equivalent fields within the identified external document. Thereafter, routine 600 proceeds to block 622 to continue the iteration of propagating the field data to the fillable fields identified in the identified Equivalence rule.

If at decision block 608, the current field is in the current document, routine 600 proceeds to decision block 612. At decision block 612, a determination is made as to whether the current fillable field is associated with a Formatting rule, or rather whether the updated field data for the current fillable field is to be modified by a Formatting rule. If the fillable field is associated/controlled by a Formatting rule, routine 600 proceeds to block 616.

At block 616, the Formatting rule corresponding to the current fillable field is accessed and applied to the updated field data, generating formatted updated field data. At block 618. The formatted updated field data is applied/stored in the current fillable field. Thereafter, routine 600 proceeds to block 622 to continue the iteration of propagating the updated field data to the equivalent fillable fields identified in the selected Equivalence rule.

If, at decision block 612, the current field is not associated with a Formatting rule, routine 600 proceeds to block 620. At block 620, the current fillable field is updated with the updated field data. Thereafter, routine 600 proceeds to block 622 to continue the iteration of propagating the field data to the fillable fields identified in the selected Equivalence rule.

At block 622, when all of the equivalent fillable fields of the Equivalence rule have been processed, routine 600 terminates.

Regarding routine 600, while not shown in this figure, an indicator, such as a flag or semaphore, may be used to ensure that the Equivalence rule for a given document is processed only a single time, thus preventing circular calls from an external document that would result in a so-called infinite loop. Further, a flag or test may be applied to not re-update the updated fillable field.

Due to the consistency of base field data of the equivalent fillable fields in a document set, saving the content of the various fillable fields of the document set is also very efficient, resulting a minimal number of interactions between a data store and the computer that is completing the various documents of the document set. To that end, reference is made to FIG. 7.

Figure 7:
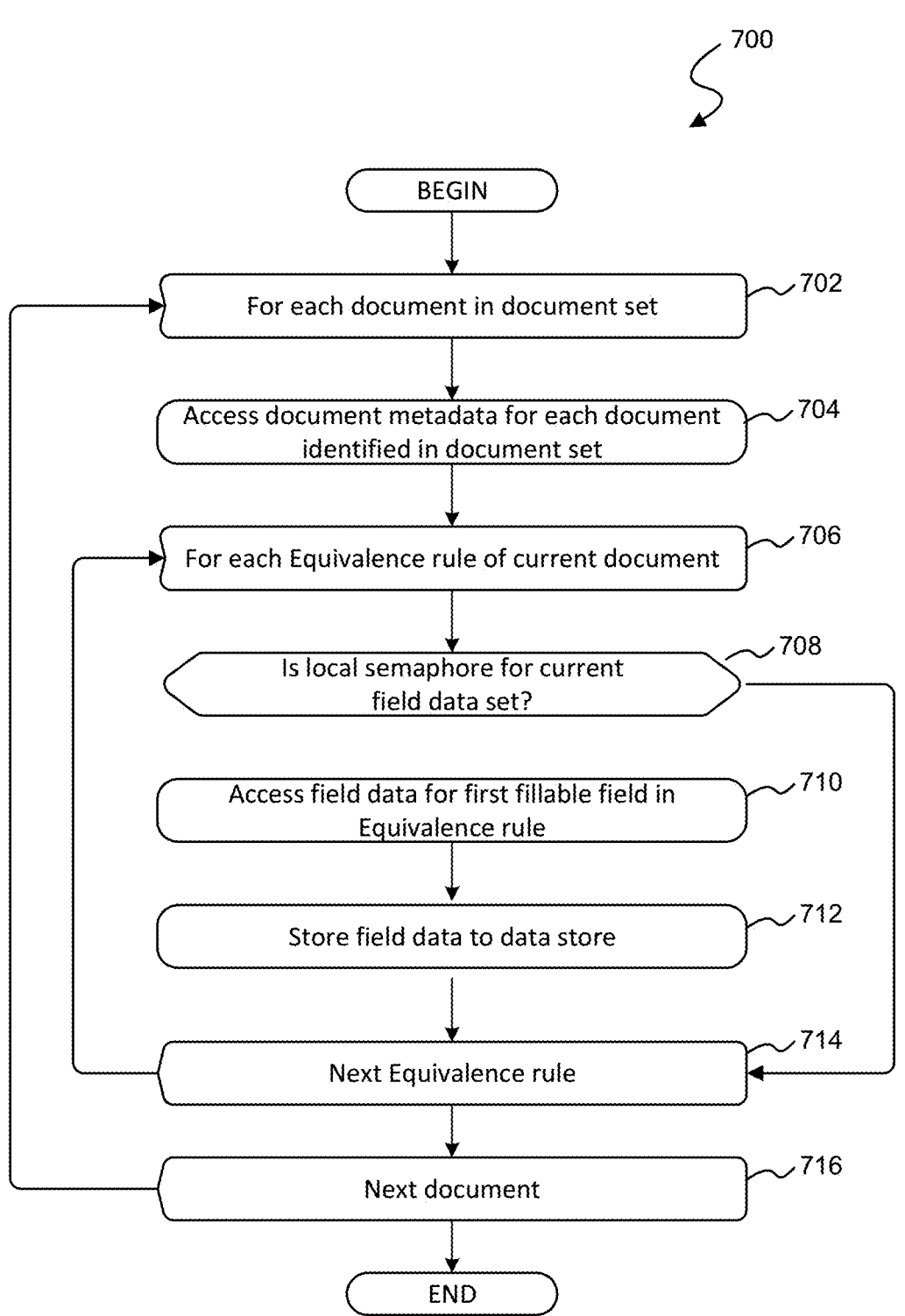
FIG. 7 is a flow diagram illustrating an exemplary computer-implemented routine for storing content of the fillable fields to a data store in accordance with aspects of disclosed subject matter.

FIG. 7 is a flow diagram illustrating an exemplary computer-implemented routine 700 for storing content of the fillable fields to a data store in accordance with aspects of disclosed subject matter. Advantageously, the fillable field data is stored independent of the fillable form/document, thereby reducing the amount of information that needs to be stored. To "reconstitute" a fillable form (at least to the extent that it was previously completed), one need only apply all or some of the computer-executable routines described above. Further, similar execution of all or some of the above-described routines are needed to complete a newer version of the fillable form (according to the metadata of that newer-version fillable form, as well as the Equivalence and Formatting rules therein).

With reference to routine 700 of FIG. 7, at block 702 an iteration is begun across all of the documents in the document set, with each iteration referring to one of the documents in the document set and, for each repetition of the steps within the iteration, the processed document is referred to as the current document. At block 704, the metadata corresponding to the current document is accessed.

At block 706, a second (internal) iteration is begun, this second iteration to iterate through each of the Equivalence rules of the current document, as listed in the metadata of the current document. As above, each processed Equivalence rule is referred to as the current Equivalence rule for the time that it is being processed. At decision block 708, recognizing that all or some of the fillable fields of the current document may have already been saved, a test of a semaphore corresponding to the field identifier (e.g., field identifier 506 as included in Equivalence rule 504) is made to determine whether the current field identifier/type for the current Equivalence rule has already been saved to the data store. If the semaphore (or flag, or bit, or value, or other feature that can indicate saved/not saved for the field identifier) indicates that the field data of this field identifier has already been saved, the routine 700 moves to the ends of the iteration (without additional processing), to block 714, where the next Equivalence rule in the current document is selected for processing. Thereafter, processing returns to block 706 to repeat, based on the newly selected current Equivalence rule.

If, at decision block 708, it is determined that the field data for the field type of the current Equivalence rule has not been saved to the data store, the routine 700 proceeds to block 710. At block 710, the field data of a first fillable field (preferably within the current document) listed in the current Equivalence rule is accessed. According to aspects of the disclosed subject matter, if a Formatting rule is applicable to the first fillable field, the reverse of the formatting is reverse, resulting in the field data that is typically applied to all of the equivalent fillable fields without formatting rules. At block 712, the field data is then stored to the data store. Thereafter, the routine proceeds to block 714 where the next Equivalence rule in the current document is selected for processing. Thereafter, the routine returns to block 706 to repeat, based on the newly selected current Equivalence rule . . . .

Of course, at block 714, when the Equivalence rules of the current document have all been processed (or skipped as the field data for that field has already been stored), the routine 700 proceeds to block 716. At block 716, a next document of the document set, one whose field data is yet to be saved, is selected as the current document. Assuming there is another document in the document set to process, the routine 700 block 702 to repeat on this newly-selected current document. Alternatively, if there are no more documents to process, the routine 700 terminates.

While fillable fields may be completed correctly, at least as far as the type of data and consistency between equivalent or common fillable fields, often fields of fillable forms must be completed according to certain rules or patterns. For example and by way of illustration and not limitation, if an applicant were to indicate citizenship of a foreign country in a fillable form, a check box in that same fillable form, indicating that the fillable form is for a foreign citizen may need to be checked. In short, one or more fillable fields (e.g., the citizenship information and the check-box indicator) could have field-correct information, but on the whole be incorrectly completed. Further, correct completion may be based on fields in multiple documents, i.e., correct completion may be based on fillable fields of multiple fillable documents. To address this need, Validation rules may also be applied.

In accordance with aspects of the disclosed subject matter, one or more Validation rules may be executed with respect to one or more fillable documents, such as documents of a document set. In various instances, Validation rules may apply to fillable fields of a single document. In such instances, that document's metadata may include the Validation rules that are applicable to its fillable fields. In other instances, Validation rules may apply to fillable fields across multiple documents. In these instances, it may be preferable to maintain the validation rules in metadata separate from any given document, or metadata associated with document sets. Of course, in additional instances, Validation rules may be found in both document-specific metadata and document set-specific metadata.

Regarding the Validation rules, a person completing a fillable document or a set of fillable documents may specifically initiate the execution of the Validation rules. In instances where there is a potential inconsistency or incorrectness, warnings may be raised to the person completing the document(s). In other instances, Validation rules may be executed at specific times and/or on a periodic basis. For example, Validation rules may be executed when the person completing the forms makes an indication to save the fillable field data. In this instance, prior to saving the field data, the applicable Validation rules (corresponding to the document or document set) are executed with warnings generated if found.

Document metadata may identify Validation rules applicable to that document. Alternatively, the Validation rules kept with document sets or independently may identify the documents to which they are applicable. Additionally, Validation rules identify one or more document/fillable field pairs, as well as logic needed to determine whether the fillable fields/fillable documents have been completed correctly. Operators such as logical operations (e.g., AND, OR, XOR, and NOT), Boolean operations (TRUE or FALSE), conditional and branching operations (IF . . . THEN . . . ELSE), comparative operators (EQUAL, LESS THAN, GREATER THAN), and the like. Assignment operations (e.g., {field}=VALUE) may be included. Complex and meaningful Validation rules may be constructed using any number of the various operations.

Figure 8:
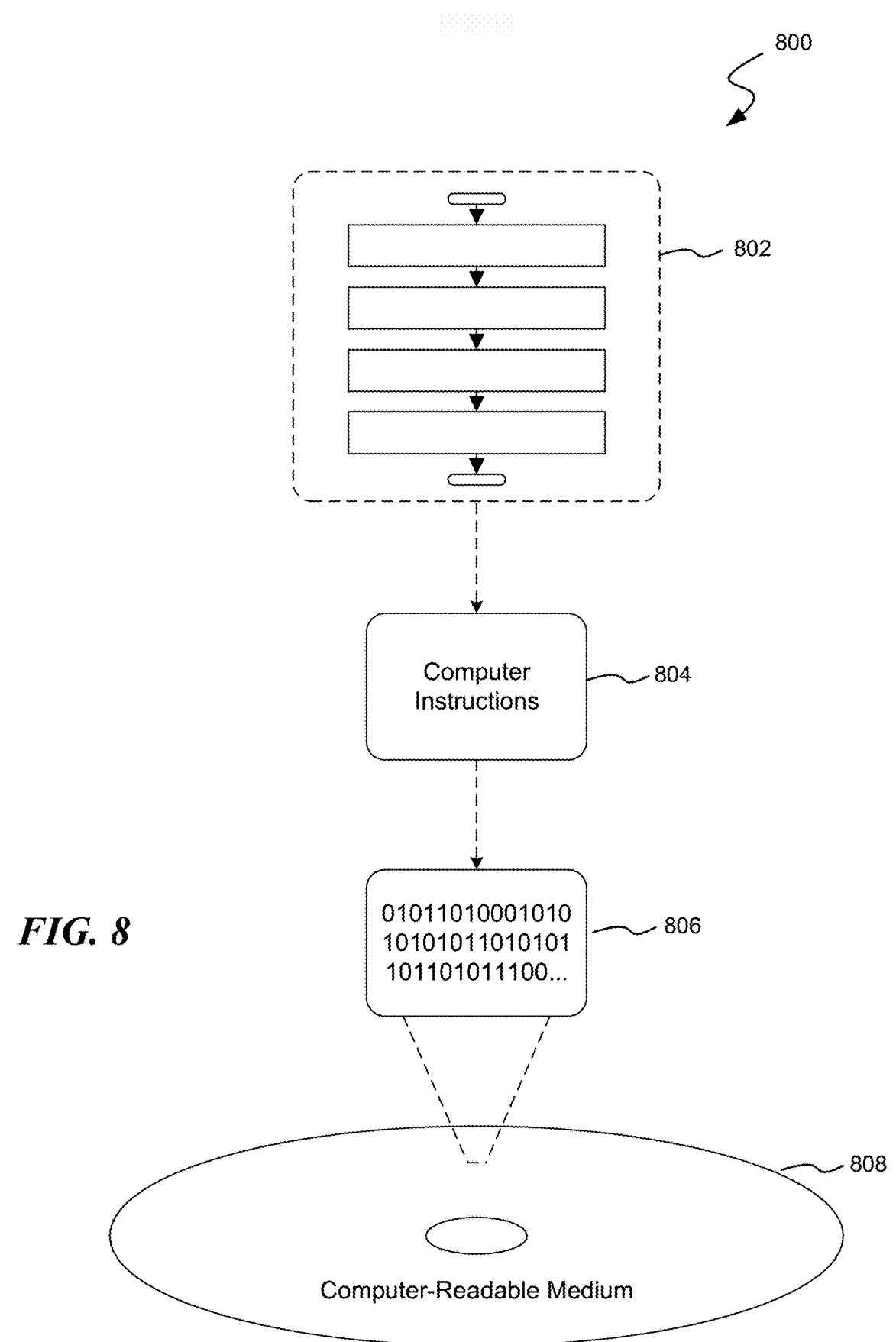
FIG. 8 is a pictorial representation of computer-readable media bearing computer-executable instructions for carrying out various aspects of the disclosed subject matter.

Turning now to FIG. 8, FIG. 8 is a pictorial representation of computer-readable media bearing computer-executable instructions for carrying out various aspects of the disclosed subject matter. Indeed, FIG. 8 illustrates the organization 800 of computer-readable media bearing executable components that, when executed on a computer system, implement the various aspects describe above of completing and validating fillable fields of fillable forms/documents. As will be appreciated by those skilled in the art, the logical organization comprises computer-readable medium 808 (e.g., a CD-R, DVD-R or a platter of a hard disk drive, an SSD device), on which is encoded computer-readable data 806. Non-limiting examples of a computer-readable medium (or media) include optical media (e.g., compact discs, "CDs", in various writable and/or non-writable forms, digital versatile discs, "DVDs" in their various writeable and/or non-writable forms, etc.), solid-state devices (e.g., USB "thumb" drives, flash memory cards or devices, etc.), magnetic discs and tapes, read-only cartridge devices, hard drives, and the like.

This computer-readable data 806 in turn comprises a set of computer-executable instructions 804 that, when executed by a processor of a computer, operate according to one or more of the embodiments of a multi-view framework (MVF) set forth herein. In one such embodiment, the computer-executable instructions 804 may be configured to perform one or more methods and/or routines, such as exemplary methods 300, 400, 600 and/or 700, for example and without limitation. In another such embodiment, the computer-executable instructions 804 may be configured to implement logical elements of a computing system, such as at least some of the exemplary computing system 900, as described below. The logical steps and/or computer-executable instructions are indicated by the logical elements 802.

Figure 9:
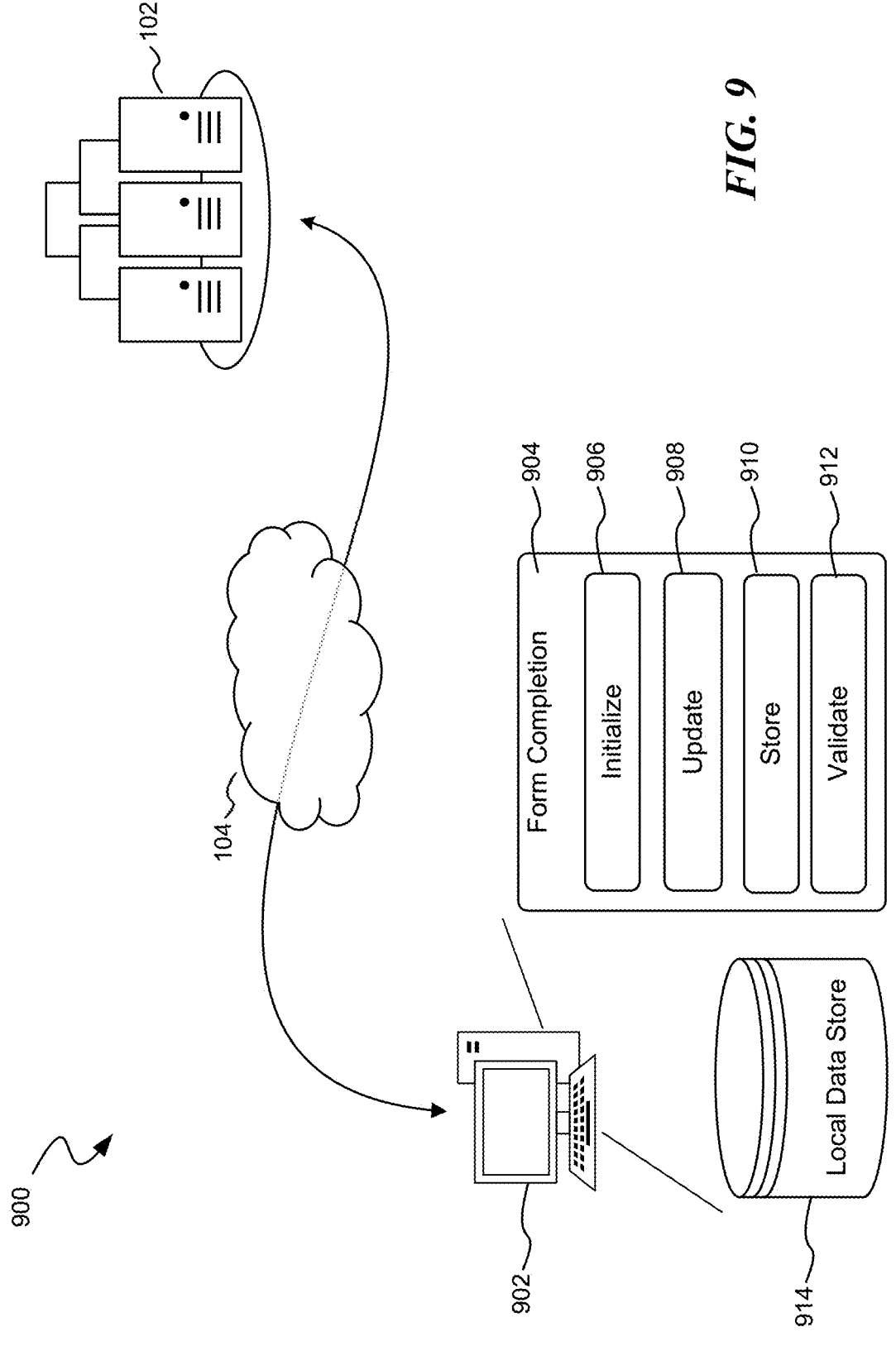
FIG. 9 is a pictorial representation of a computer system suitable for implementing aspects of the disclosed subject matter.

Turning to FIG. 9, this figure illustrates a pictorial representation of a computer system 900 suitable for implementing aspects of the disclosed subject matter. The computer system 900 includes a computing device 902 executing all or some of the various routines and/or processes described above to carry out efficient fillable form completion and/or validation. These various routines and/or processes include routines 300, 400, 600 and/or 700. As discussed and described above, a person can use these various processes to efficiently carry out form completion on a single fillable form, or over various documents of a document set.

The computing device includes typical features including, by way of illustration and not limitation, one or more processors, memory, and a network communication module. Illustrative, non-limiting examples of suitable computer devices include laptop computers, desktop computers, mini- and/or mainframe computers, tablet computers, mobile phones, and the like.

As those skilled in the art will appreciate, processors execute computer-executable instructions retrieved from memory, including (indirectly) from computer-readable media, such as the computer-readable media 800 of FIG. 8, in carrying out implementing and executing defined functions and instructions, including the completion and validation of one or more fillable forms. Such processors include, by way of illustration and not limitation, single-processor units, multi-processor units, single-core units, multi-core units, and the like.

Memory generally comprises both volatile and non-volatile memory. As will be readily appreciated, volatile memory retains or stores data and/or information so long as the volatile memory is supplied with power. In contrast, non-volatile memory stores, or persists, data and/or information even when a power is not supplied to that memory. Generally speaking, in a computer device, memory components such as random-access memory (RAM) and CPU cache memory are examples of volatile memory. In contrast, read-only memory (ROM), solid-state memory devices, memory storage devices, and/or memory cards are examples of non-volatile memory. Local data storage device 914 is an example of non-volatile memory.

The network communication module is that combination of hardware and supporting software that enables the computer device to communicate with other computers, services, and/or components over a computer network 104 using one or more communication protocols via a physical/tangible (e.g., wired, optical, etc.) connection, a wireless connection (e.g., Bluetooth, Wi-Fi, etc.), or a combination if both. The network communication module is sometimes implemented as a network interface card or NIC. Indeed, a network communication component is typically comprised of hardware and/or firmware components, and may also include or comprise executable software components, that transmit and receive digital and/or analog signals over a transmission medium (i.e., the computer network.)

The illustrated computer device also includes a form completion module 904. The form completion module, in execution on the computer device 902, is used by a person to complete one or more fillable forms. As shown in FIG. 9, the form completion module includes or comprises various executable components including an initialize component 904, an update component 906, a store component 908 and a validate component 910.

The initialize component 906 is used to initialize the fillable fields of one or more documents of a document set according to saved data for the person (or for a target person). This saved data may reside locally, i.e., on the local data store 914, or remotely with data source 102 (as described above.) Once data items are obtained, and according to aspects of the disclosed subject matter, lateral propagation of that data to equivalent fillable fields means that a minimum number of interactions with a data source is necessary. This lateral propagation utilizes Equivalence rules and Formatting rules to propagate field data for each field throughout a document and/or document set. Of course, in some instances there may be no saved data available for initializing the one or more fillable forms of a document set on the data source and/or in local data storage.

The update component 908 allows the person editing the one or more fillable forms/documents to enter data in one location and have the updated data laterally propagated throughout equivalent fillable fields to ensure consistency and rapid completion. As with the initialize component, update component 906 utilizes the Equivalence and Formatting rules to propagate field data for each field throughout a document and/or document set.

The store component 910 efficiently saves the field data independently from the fillable forms. Field data is extracted from the fillable fields of a document utilizing the Equivalence and Formatting rules to ensure that only one instance of equivalent fields is accessed and stored for all of the equivalent fields. Storing the data may be made to a local data store, i.e., local data store 914, or remotely in the data source 102.

The validate component 912 enables inter- and intra-document validation of the fillable fields according to one or more Validation rules.

While various novel aspects of the disclosed subject matter have been described, it should be appreciated that these aspects are exemplary and should not be construed as limiting. Variations and alterations to the various aspects may be made without departing from the scope of the disclosed subject matter.

The invention claimed is:

1. A computer-implemented method for efficient initialization of form-fillable documents of a document set, the method comprising at least each of the following as executed on a computing device:

identifying a document set comprising a plurality of form-fillable documents to be to be initialized with field data corresponding to a target source, wherein each form-fillable document of the document set is associated with corresponding metadata, wherein;

each corresponding document metadata comprises one or more sets of equivalent fields in the corresponding form-fillable document; and each set of equivalent fields includes one or more field identifiers to a corresponding one or more fillable fields within the corresponding form-fillable document that use the same field data, and a data source identifier that identifies field data corresponding to the target source for the set equivalent fields; and all fillable fields in the corresponding form-fillable document are identified in only one set of equivalent fields of the one or more sets of equivalent fields in the corresponding document metadata of the form-fillable document;

for each form-fillable document of the document set:

accessing a currently iterated form-fillable document of the document set;

accessing corresponding document metadata for the currently iterated form-fillable document;

for each set of equivalent fields of the corresponding document metadata for the currently iterated form-fillable document:

determining whether the fillable fields identified in the currently iterated set of equivalent fields have been initialized; and upon determining that the fillable fields identified in the currently iterated set of equivalent fields have not been initialized:

accessing field data according to the data source identifier of the currently iterated set of equivalent fields; and for each fillable field of the currently iterated set of equivalent fields, initializing a currently iterated fillable field by propagating the accessed field data to the currently iterated fillable field.

2. The computer-implemented method of claim 1:

wherein the set of equivalent fields of the corresponding document metadata for the currently iterated form-fillable document further comprises at least one external field identifier of an external document of the document set; and wherein the computer-implemented method further comprises:

determining whether the currently iterated fillable field is an external fillable field in an external document; and upon determining that the currently iterated fillable field is an external fillable field in an external document, initializing the currently iterated fillable field by propagating the accessed field data to the external fillable field in the external document.

3. The computer-implemented method of claim 2, wherein the set of equivalent fields of the corresponding document metadata for the currently iterated form-fillable document includes only one external field identifier for any given external document of the document set.

4. The computer-implemented method of claim 1, wherein propagating the accessed field data to the external fillable field in the external document causes propagation of the accessed field data to equivalent fields of the external fillable field in the external document.

5. The computer-implemented method of claim 1:

wherein the corresponding document metadata for the currently iterated form-fillable document includes one or more formatting rules associated with one or fillable fields that specifies a format of data entered in the associated one or more fillable fields; and wherein propagating the accessed field data to the currently iterated fillable field comprises:

determining whether the currently iterated fillable field is associated with a formatting rule; and upon determining that the currently iterated fillable field is associated with a formatting rule, formatting the accessed field data according to the formatting rule and entering the formatted field data into the currently iterated fillable field.

6. A computer-implemented method for maintaining consistency among equivalent fillable fields of one or more form-fillable documents of a set of documents, the method comprising each of the following as executed on a computing device:

receiving an indication that field data of a first fillable field in a first form-fillable document of the set of documents has been modified;

accessing the modified field data of the first fillable field;

accessing first document metadata of the first form fillable document, the first document metadata including one or more sets of equivalent fields, wherein each set of equivalent fields identifies a set of fillable fields within the first form-fillable document that share the same base data, and wherein each fillable field in the first form-fillable document is identified in only one of the one or sets of equivalent fields;

identifying the set of equivalent fields of the one or more sets of equivalent fields from the first document metadata that includes the first fillable field; and propagating the modified field data to each fillable field, excluding the first fillable field, of the identified set of equivalent fields.

7. The computer-implemented method of claim 6:

wherein the identified set of equivalent fields identifies an external fillable field in an external form-fillable document of the set of the set of documents; and wherein propagating the modified field data to the external fillable field comprises propagating the modified field data to the external fillable field in the external form-fillable document.

8. The computer-implemented method of claim 7, wherein propagating the modified field data to the external fillable field in the external form-fillable document causes propagation of the modified field data to equivalent fields of the external fillable field in the external form-fillable document.

9. The computer-implemented method of claim 6:

wherein the modified field data is empty field data; and wherein propagating the modified field data to each fillable field, excluding the first fillable field, of the identified set of equivalent fields comprises propagating empty field data to each fillable field, excluding the first fillable field, of the identified set of equivalent fields.

10. The computer-implemented method of claim 6:

wherein the document metadata for the first form-fillable document includes one or more formatting rules associated with one or fillable fields that specifies a format of data entered in the associated one or more fillable fields; and wherein propagating the modified field data to each fillable field, excluding the first fillable field, of the identified set of equivalent fields comprises, for each fillable field of the identified set of equivalent fields, excluding the first fillable field:

determining whether a currently iterated fillable field is associated with a formatting rule of the one or more formatting rules; and upon determining that the currently iterated fillable field is associated with a formatting rule, formatting the modified field data according to the formatting rule and entering the formatted modified field data into the currently iterated fillable field.

11. The computer-implemented method of claim 10, wherein accessing the modified field data of the first fillable field:

wherein the document metadata for the first form-fillable document includes one or more formatting rules associated with one or fillable fields that specifies a format of data entered in the associated one or more fillable fields; and determining the first fillable field is associated with a first formatting rule of the one or more formatting rules; and upon determining that the first fillable field is associated with a first formatting rule:

accessing the current data of the first fillable field; and reversing the formatting of the first formatting rule applied to the current data of the first fillable field, thereby generating the modified field data.

12. A computer-implemented method for efficiently storing field data of fillable fields of a plurality of form-fillable documents of a document set, the method comprising each of the following as executed on a computing device having a least a processor and a memory:

receiving a first indication to store field data of the fillable fields of the plurality of form-fillable documents;

for each form-fillable document of document set, and wherein each form-fillable document of the document set comprises one or more fillable fields:

accessing document metadata corresponding to the currently iterated form-fillable document, the corresponding document metadata comprising one or more sets of equivalent fillable fields in the currently iterated form-fillable document; and for each set of equivalent fillable fields of the one or more sets of equivalent fillable fields:

determining whether field data of a first fillable field of the currently iterated set of equivalent fillable fields has already been stored to a data store; and if it is determined that the field data of the first fillable field of the currently iterated set of equivalent fillable fields has not already been stored to a data store:

accessing field data of the first fillable field; and storing the accessed field data in a data store in associated with a field type for the first fillable field; and setting a condition corresponding to the field type of the first fillable field that the field data for the corresponding field type of the first fillable field has been stored in a data store.

13. The computer-implemented method of claim 12, wherein accessing field data of the first fillable field comprises:

determining whether a formatting rule of a plurality of formatting rules applies to the first fillable field;

upon determining that a first formatting rule of the plurality of formatting rules applies to the first fillable field:

accessing the current data of the first fillable field; and reversing the formatting of the first formatting rule applied to the current data of the first fillable field, thereby generating the accessed field data.

14. The computer-implemented method of claim 12, wherein the field data of the fillable fields of the plurality of documents the form-fillable documents of the document set are stored independently of the form-fillable documents.

15. The computer-implemented method of claim 12, further comprising:

upon receiving the first indication to store field data of the fillable fields of the plurality of form-fillable documents:

executing one or more validation rules corresponding to at least some of the plurality of form-fillable documents of the document set;

determining that a validation issue exists among the fillable fields of the plurality of form-fillable documents based on the execution of at least one validation rule of the one or more validation rules; and issuing a notice to a user of the computer-implemented indicating that the validation issue exists among the fillable fields of the plurality of form-fillable documents.

16. The computer-implemented method of claim 12, further comprising:

prior to setting a condition for each distinct field type of the fillable fields of the plurality of form-fillable document in the document set indicating that field data for the field type has not been stored in a data store; and wherein determining whether field data of a first fillable field of the currently iterated set of equivalent fillable fields has already been stored to a data store comprises determining whether the condition for the field type of the first fillable field is set indicating that the field data for the field type of the first fillable field has been stored in a data store.

\* \* \* \* \*